United States Patent [19]

Choi

[11] Patent Number: 5,668,792
[45] Date of Patent: Sep. 16, 1997

[54] TURNTABLE OF A DISC PLAYER FOR BOTH A COMPACT DISC AND A MINI DISC

[75] Inventor: Youngsuk Choi, Seoul, Rep. of Korea

[73] Assignee: Daewoo Electronics Co., Ltd., Seoul, Rep. of Korea

[21] Appl. No.: 361,488

[22] Filed: Dec. 22, 1994

[30] Foreign Application Priority Data

Dec. 24, 1993 [KR] Rep. of Korea ............... 93/29447

[51] Int. Cl.⁶ .................. G11B 17/028; G11B 17/04
[52] U.S. Cl. .......................... 369/271; 360/99.12
[58] Field of Search .................... 369/271, 270, 369/264; 360/99.12, 98.08

[56] References Cited

U.S. PATENT DOCUMENTS 5,228,023  7/1993  Hartog ................... 369/271

FOREIGN PATENT DOCUMENTS

| 0 518 259 | 12/1992 | European Pat. Off. . | |
| 0 526 204 | 2/1993 | European Pat. Off. . | |
| 0553034 | 7/1993 | European Pat. Off. | 369/264 |
| 0 576 253 | 12/1993 | European Pat. Off. . | |
| 0 616 322 | 9/1994 | European Pat. Off. . | |
| 0 632 441 | 1/1995 | European Pat. Off. . | |
| 58-194181 | 11/1983 | Japan | 369/270 |
| 63-155453 | 6/1988 | Japan | 369/271 |
| 4-360056 | 12/1992 | Japan | 369/264 |
| 5-334782 | 12/1993 | Japan . | |

OTHER PUBLICATIONS

Neues Aus Der Technik, No. 4, Dec. 15, 1988, Wurzburg, Germany, pp. 2–3, XP 000120750 'Plattenteller', the whole document.

Primary Examiner—Robert S. Tupper
Assistant Examiner—Kevin M. Watkins
Attorney, Agent, or Firm—Oliff & Berridge

[57] ABSTRACT

Disclosed is a turntable of a disc player on which a mini disc and a compact disc can be loaded in an alternative manner, and which has a simple structure, and thereby can be made to be small and compact. The turntable has a mini disc loading body, a compact disc loading body, an assembling section for assembling the mini disc loading body and the compact disc loading body with each other.

3 Claims, 3 Drawing Sheets

TURNTABLE OF A DISC PLAYER FOR BOTH A COMPACT DISC AND A MINI DISC

BACKGROUND OF THE INVENTION

1. Field of the Invention

The present invention relates to a turntable of a disc player on which a mini disk or a compact disk can be selectively loaded.

2. Description of the Prior Art

Recently, a mini disk player and a compact disk player have been widely used as a device for recording/reproducing information.

A mini disk and a compact disk (which is larger than the mini disk) are magnetic or optical recording media respectively having a shape of a disk, the former usually being encased in a cartridge while the latter not. In the mini disk player, the cartridge is loaded on a turntable thereof, and information is recorded on or reproduced from the mini disk encased in the cartridge. Meanwhile, in the compact disk player, the compact disk is directly loaded on the turntable as a naked shape of the disk.

Because the sizes and the appearances of the compact disc and the mini disc are different from each other as described above, it is difficult to load the compact disc and the mini disc on a single turntable.

Accordingly, there has been proposed a disc player having two turntables respectively for loading the compact disc thereon and for loading the mini disc thereon, so as to overcome the above-described shortage of the conventional disc players. However, the disc player of this type has many disadvantages such that the size thereof is too large, the structure thereof is complicated, and the manufacturing cost thereof is increased, because two separate turntables are installed in the disk player.

A Japanese Patent Application No. 3-191522 filed on Jul. 31, 1991, by Katsuichi Sakurai et al., corresponding to U.S. Pat. No. 5,299,185 discloses a disc player in which both a naked disc and a disc encased in a cartridge can be loaded on the single turntable.

In the disk player according to the above patent, a disc tray can move horizontally among a first, a second, and a third positions. A naked disc can be received on the disc tray at the first position, and loading of the received naked disc is completed at the second position. The third position is located at the opposite side of the first position. When the naked disc is loaded, the disc tray receives the naked disc at the first position, and then travels to the second position at which the disc is loaded on a turntable. When a disc encased in a cartridge is loaded and reproduced in the disc player, the disc tray is located at the third position so as not to interfere with the loading of the cartridge.

However, there are some disadvantages that the above patent could be applied only a disc player in which a naked disc and a cartridge-encased disc having the same size to each other are loaded, and that a cartridge for mounting the naked disc thereon must be larger than a certain size because a slit in the front side the disc player is used for loading/ejecting both the tray for mounting the naked disc thereon and the cartridge.

In the above described disc player for both a naked disc and a disc encased in a cartridge, separate devices such as a cartridge carrying mechanism, a chucking means, and a controlling means are necessary. Therefore, it is difficult to make the disc player small, thin, and compact, and the structure of the disc player is complicated. Further, the disc-loading technique of the above disc player can be adopted in a front-loading type disc player but not in a top-loading type disc player.

SUMMARY OF THE INVENTION

The present invention has been made to overcome the above described disadvantages of the conventional disc player, and accordingly it is an object of the present invention to provide a turntable of a disc player on which a mini disc and a compact disc can be loaded in an alternative manner, and which has a simple structure, and thereby can be made to be small and compact.

To achieve the above object, the present invention provides a turntable of a disc player for both a compact disc and a mini disc comprising:

a disc cartridge loading body for loading a disc cartridge encasing a first disc thereon;

a naked disc loading body disposed under the disc cartridge loading body to load a naked disc larger than the first disc thereon;

an assembling section for assembling the disc cartridge loading body and the naked disc loading body with each other.

The turntable may further comprise a disc cartridge guiding plate fitted in a lower part of the disc cartridge loading body to guide loading of a disc cartridge and prevent the disc cartridge from being separated from the turntable an a naked disc guiding member elastically disposed on the naked disc loading body to guide loading of a naked disc.

In a mini disc player having a turntable according to the present invention, the turntable has a mini disc cartridge loading body and a compact disc loading body, and thereby a mini disc and a compact disc can be loaded in an alternative manner, and then reproduced or recorded on the single turntable. When a mini disc cartridge is loaded on the turntable, a magnet received in a magnet receiving recess clamps the mini disc encased in a cartridge by a magnetic force thereof. When a compact disc is loaded, a clamping head for a compact disc that is guided by a compact disc guiding ring and having the magnet received therein, clamps the compact disc firmly onto the turntable. By the present invention, provided is a disc player which has a simple construction, and thereby can be made to be small and compact.

BRIEF DESCRIPTION OF THE DRAWINGS

The above object, and other features and advantages of the present invention will become more apparent by describing in detail the preferred embodiment of the present invention with reference to the attached drawings, in which.

DESCRIPTION OF THE PREFERRED EMBODIMENT

Hereinafter, the present invention will be explained in detail with reference to the accompanying drawings.

Figure 1:
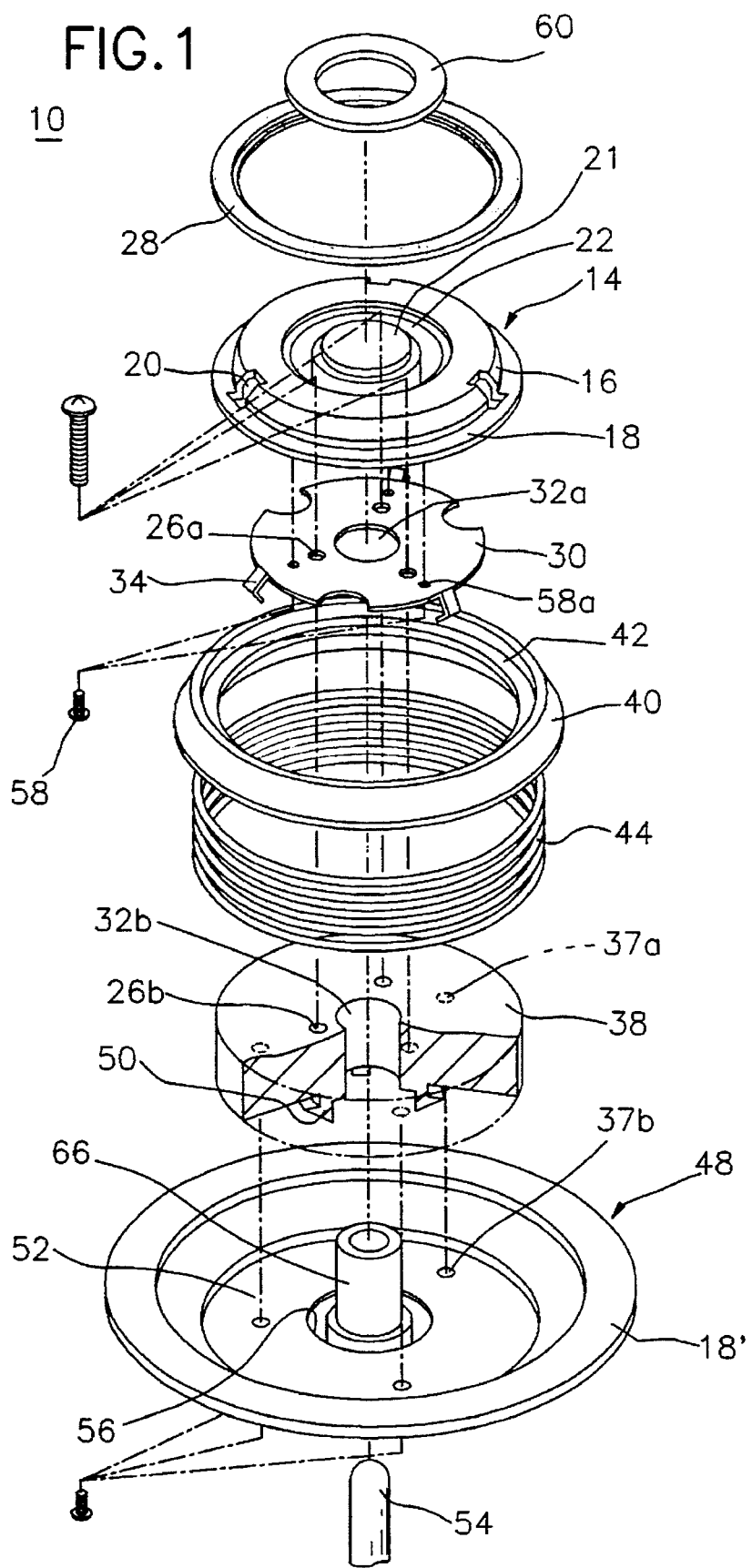
FIG. 1 is an exploded perspective view for showing several components constituting a turntable of a disc player according to an embodiment of the present invention.

FIG. 1 is an exploded perspective view for showing several components constituting a turntable 10 of a disc player according to an embodiment of the present invention.

As shown in FIG. 1, turntable 10 on which a compact disc and a mini disc can be loaded in an alternative manner has largely three sections. That is, turntable 10 has a mini disc loading body 14 for loading a mini disc cartridge thereon, a compact disc loading body 48 disposed under mini disc loading body 14 to load a compact disc thereon, and an assembling section 38 for assembling mini disc loading body 14 and compact disc loading body 48 with each other.

As shown in FIG. 1, mini disc loading body 14 has a shape of a stepped disc having an inclined guide surface 16 formed at the upper periphery thereof, and a mini disc loading surface 18 extending horizontally a predetermined width outward from the lower end of guide surface 16. Guide surface 16 has three engagement holes 20 spaced out at regular circumferential intervals of 120 degrees apart from each other.

Mini disc loading body has a center recess 21 formed at the center thereof to receive an upper end of a bushing 66 which will be described later in detail. An outer periphery of a cylindrical wall defining center recess 21 has the same depth as that of an inner cylindrical surface of an upper section of mini disc loading body at the outer periphery of which guide surface 16 is formed, and the outer periphery of the cylindrical wall and the inner cylindrical surface of the upper section are connected and incorporated with each other through a bottom surface which is not shown. The bottom surface has first screw holes spaced out at regular circumferential intervals of 120 degrees apart, which are also not shown. A magnet receiving recess 22 for receiving a first magnet 60 is defined by the outer periphery of the cylindrical wall, the inner cylindrical surface of the upper section, and the bottom surface.

A felt 28 usually made of artificial resin is attached on mini disc loading surface 18. The felt 28 effectively produces friction force by contacting with mini disc surface encased in cartridge.

A guide plate 30 made of thin steel plate is assembled at a lower part of mini disc loading body 14. Guide plate 30 has a first shaft hole 32a formed at the center thereof, and three elastic protuberances 34 formed incorporated at the outer circumference thereof while being spaced out at regular circumferential intervals of 120 degrees apart from each other. Three elastic protuberances 34 are respectively engaged in each of engagement holes 20 to assemble guide plate 30 with mini disc loading body 14.

Guide plate 30 further has three second screw holes 26a formed therein to be in alignment with the first screw holes formed in the bottom surface of magnet receiving recess 22, and three guide plate assembling holes 58a formed outside of second screw holes 26a.

Mini disc loading body 14 with which guide plate 30 is assembled is mounted on a compact disc guide ring 40. Compact disc guide ring 40 has a mini disc supporting shelf 42 formed and incorporated at an upper part thereof and protruding inward a predetermined width therefrom, and a spring receiving groove 46 formed at a lower surface thereof to receive a spring 44 as shown in detail in FIG. 2.

Assembling section 38 for assembling mini disc loading body 14 and compact disc loading body 48 has a cylindrical shape of a predetermined height. Assembling section 38 has a second shaft hole 32b formed at the center thereof, and three third screw holes 26b formed therein and spaced out at regular circumferential intervals of 120 degrees apart. Third screw holes 26b are respectively in alignment with each of second screw holes 26a. A plurality of hooks 50 for assembling compact disc loading body with assembling section 38 protrude downward from a lower surface of assembling section 38. Assembling section 38 has three fourth screw holes 37a formed at there lower surface thereof. Fourth screw holes 37a spaced out at regular circumferential intervals of 120 degrees apart and fifth screw holes 37b as will be described below are coupled with each other by screws.

Compact disc loading body 48 has an upper surface having a shape of a disc, a lower surface having a smaller diameter than that of the upper surface, and an inclined side wall formed between the upper and the lower surfaces. Accordingly, an assembling section receiving recess 52 is defined by the upper and the lower surfaces, and the inclined side wall. The lower surface has a center opening 56 formed at the center thereof.

A bushing 66 having a spindle shaft 54 fitted therein is inserted through center opening 56, and hooks 50 protruding from the lower surface of assembling section 38 are engaged in center opening 56 therethrough. Assembling section receiving recess 52 has three fifth screw holes 37b formed at a bottom surface thereof and spaced out at regular circumferential intervals of 120 degrees. The upper surface of compact disc loading body 48 serves as a compact disc loading surface 18' for loading a compact disc thereon.

Figure 2:
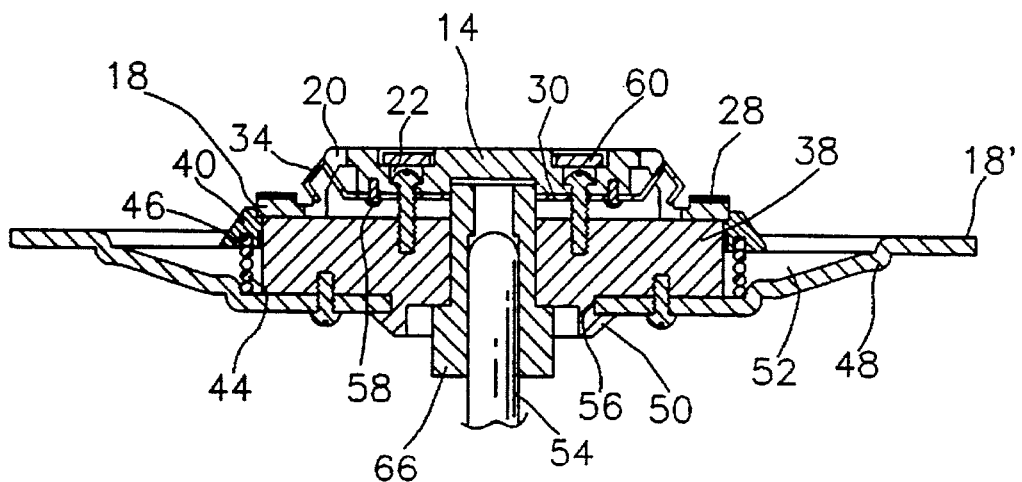
FIG. 2 is a side sectional view for showing the turntable as shown in FIG. 1, in which the components are assembled.
Figure 3:
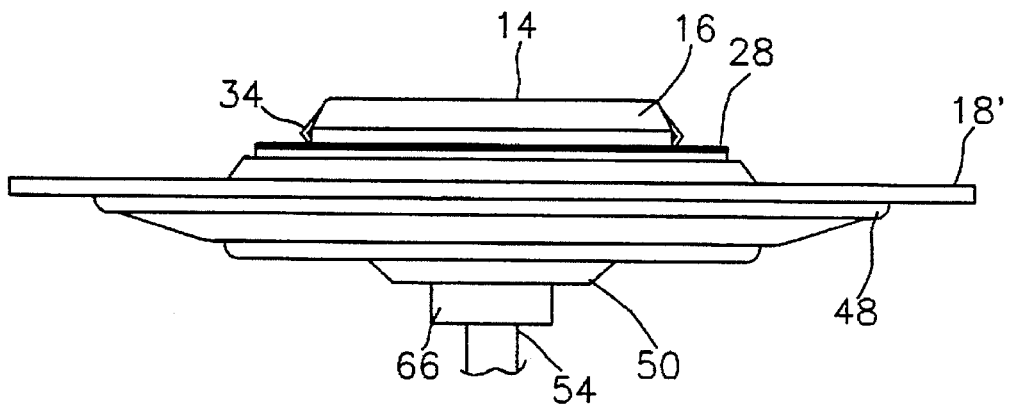
FIG. 3 is a side elevational view for showing the turntable as shown in FIG. 1, in which the components are assembled.

FIGS. 2 and 3 are a side sectional view and an elevational view for showing the turntable shown in FIG. 1, in which the components are assembled. Hereinafter, the assembling process of the turntable will be described.

Firstly, to assemble guide plate 30 with mini disc loading body 14, three elastic protuberances 34 of guide plate 30 are fitted in engagement holes 20 in guide surface 16. Then, screws 58 are fitted through guide plate assembling holes 58a from the lower side, so that guide plate 30 is fixedly assembled with mini disc loading body 14.

Then, assembling section 38 is fixedly fitted on the upper end of spindle shaft 54 fitted in bushing 66, and assembling section 38 is received in assembling section receiving recess 52 so that hooks 50 are engaged in center opening 56.

Next, compact disc guide ring 40 with spring 44 is assembled on the outer periphery of assembling section 38. And then, fourth screw holes 37a of compact disc loading body 48 and fifth screw holes 37b are coupled together by screw. Mini disc loading body 14 assembled with guide plate 30 is put on mini disc supporting shelf 42, and then is fixedly assembled with assembling section 38 by fitting screws through the bottom surface of magnet receiving recess 22 formed in mini disc loading body 14.

Lastly, first magnet 60 having a shape of a ring is fitted in magnet receiving recess 22 formed in mini disc loading body 14. Then, an assembly of a turntable for both a mini disc and a compact disc is completed.

Figure 4:
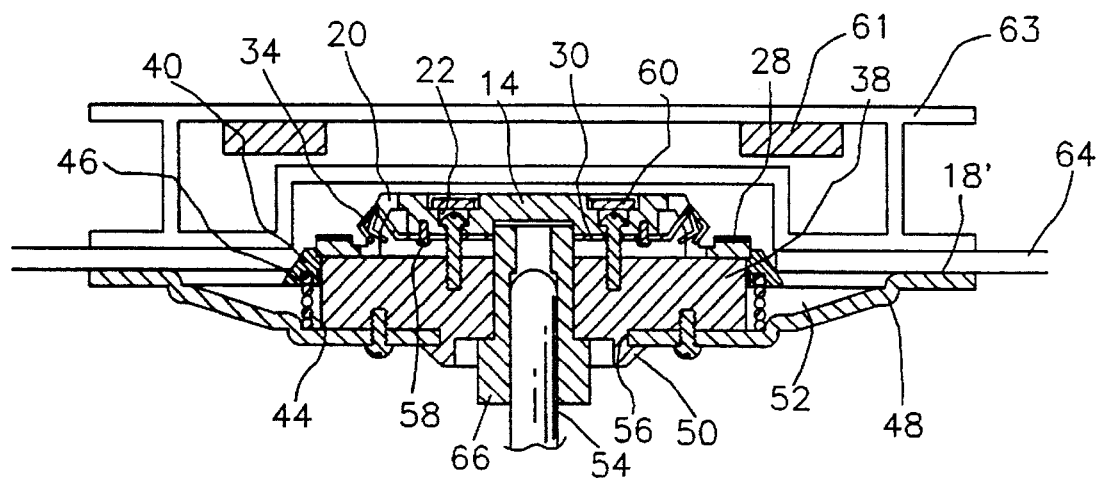
FIGS. 4 and 5 are a side sectional views for showing the turntable shown as in FIG. 1, showing the states that a compact disc and a mini disc respectively are loaded thereon.
Figure 5:
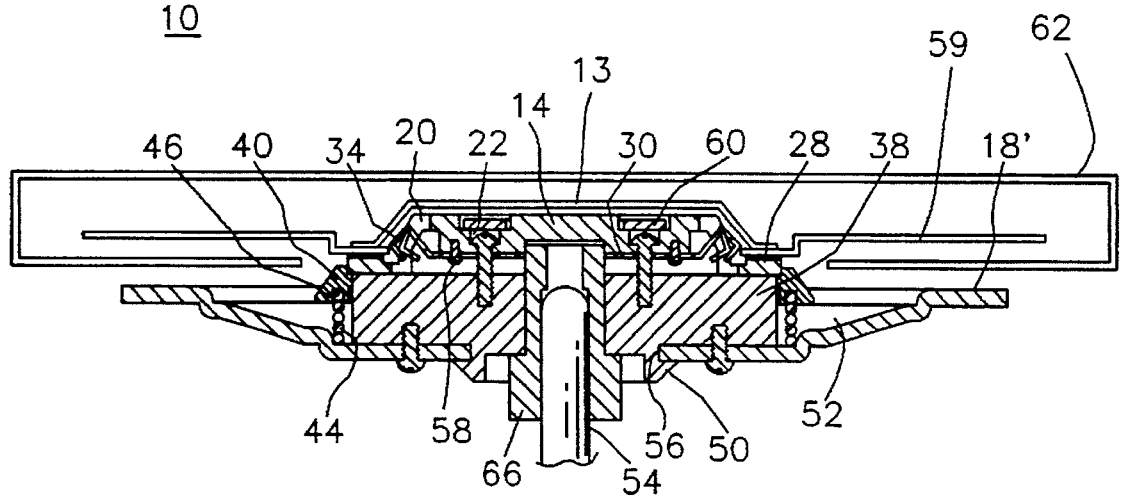

FIGS. 4 and 5 are side sectional views showing the turntable shown in FIG. 1, showing the state that a compact disc and a mini disc respectively are loaded thereon.

Hereinafter, the operation of the turntable according to the present invention will be explained when a compact disc or a mini disc is loaded thereon.

As shown FIG. 4, When the disc tray mounting compact disc 64 thereon is loaded, a clamping head 63 in which a second magnet 61 is received is moved downwardly. At that time, compact disc guiding ring 40 performs an auto-centering to absorb the gap of the inner hole of compact disc 64 by the magnetic force between compact disc loading body 48 and second magnet 61.

When the disk tray mounting a mini disc cartridge 62 thereon is loaded, as shown in FIG. 5, mini disc cartridge 62 having been carried by the disc tray performs the auto centering to absorb the gap of the inner hole of mini disc 59 while pressing elastic protuberances 34 fitted in engagement holes 20, by magnetic force between first magnet 60 and steel center plate 13 disposed in of mini disc cartridge 62, and then is loaded on mini disc loading surface.

After mini disc cartridge 62 is loaded on mini disc loading surface 18, there is no possibility of danger that mini disc cartridge 62 could be separated from turntable 10 in the course of the reproducing operation of the disc player due to the engagement of elastic protuberances 34 in engagement holes 20.

As described above, a mini disc and a compact disc can be loaded on a single turntable of the disc player according to the present invention in an alternative manner, and thereby the construction can be simplified. Further, it is possible to make the disc player small, thin, and compact.

The present invention was described in the above based on the preferred embodiment, and the present invention is not limited to the preferred embodiment, but various changes and modifications can be added without departing from the scope of the present invention.

What is claimed is:

1. A turntable of a disc player for both a compact disc and a mini disc comprising:

a mini disc cartridge loading means for loading a disc cartridge encasing the mini disc thereon, the mini disc cartridge loading means having an inclined guide surface formed at the upper periphery thereof, a mini disc loading surface extending horizontally a predetermined width outward from the lower end of the guide surface, at least three engagement holes formed in the guide surface and spaced out regular circumferential intervals apart from each other, and a magnet receiving recess formed concentrically within the guide surface surrounding a center portion of the mini disc cartridge loading means and having a predetermined depth to receive a magnet, the magnet generating a magnetic force to secure the mini disc on the mini disc loading surface when the mini disc is loaded;

a compact disc loading means disposed under the mini disc cartridge loading means for loading the compact disc larger than the mini disc thereon;

an assembling means for assembling the mini disc cartridge loading means and the compact disc loading means with each other wherein the compact disc loading means has a receiving recess formed at a center thereof to receive the assembling means, an annular disc loading surface formed at an outer periphery of the compact disc loading means receiving recess and having a predetermined width, and a center opening formed at a center of a lower surface of the compact disc loading means receiving recess in order for hooks of the assembling means to be engaged therein;

a mini disc cartridge guiding means fitted in a lower part of the mini disc cartridge loading means for guiding loading of the disc cartridge and preventing the mini disc cartridge from being separated from the turntable, the mini disc cartridge guiding means having a plurality of elastic protuberances formed at a periphery thereof to be fitted in the engagement holes, a mini disc supporting shelf formed at an upper part of the mini disc cartridge guiding means and protruding inwardly a predetermined width therefrom to support the mini disc cartridge loading means put thereon, and a spring receiving groove formed at a lower surface of the mini disc cartridge guiding means to receive a spring, the number of the elastic protuberances being equal to that of the engagement holes; and a compact disc guiding means elastically disposed on the compact disc loading means for guiding loading of the compact disc.

2. The turntable of a disc player for both a compact disc and a mini disc as claimed in claim 1, wherein the assembling means has a cylindrical shape of a predetermined height, said hooks protruding downwardly from a lower surface thereof.

3. The turntable of a disc player for both a compact disc and a mini disc as claimed in claim 1, wherein the mini disc cartridge loading means comprises at least three screw holes formed at a bottom surface between the magnet receiving recess and an opposite inner side of the guide surface, and the mini disc cartridge guiding means and the assembling means respectively comprise at least three screw holes, the mini disc cartridge loading means, the mini disc cartridge guiding means, and the assembling means being assembled with each other by a fixing means fitted through the screw holes.

* * * * *